US012706986B2

(12) United States Patent
Geerinck

(10) Patent No.: US 12,706,986 B2
(45) Date of Patent: Aug. 11, 2026

(54) PLATFORM FOR MULTI-STREAM SAMPLING AND VISUALIZATION

(71) Applicant: Microsoft Technology Licensing, LLC, Redmond, WA (US)

(72) Inventor: Xavier Geerinck, Aventin (BE)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

(21) Appl. No.: 18/798,748

(22) Filed: Aug. 8, 2024

(65) Prior Publication Data

US 2024/0414244 A1 Dec. 12, 2024

Related U.S. Application Data

(63) Continuation of application No. 17/748,015, filed on May 18, 2022, now Pat. No. 12,088,685, which is a continuation of application No. 16/705,117, filed on Dec. 5, 2019, now Pat. No. 11,368,549.

(51) Int. Cl.

*H04L 67/62* (2022.01)
*G06F 16/2455* (2019.01)
*H04L 67/10* (2022.01)

(52) U.S. Cl.

CPC ........ *H04L 67/62* (2022.05); *G06F 16/24568* (2019.01); *H04L 67/10* (2013.01)

(58) Field of Classification Search

CPC ....... H04L 67/62; H04L 67/10; H04L 65/612; H04L 65/765; H04L 67/567; H04L 67/75; G06F 16/24568; H04N 21/23418; H04N 21/2665; H04N 21/8545; H04N 21/47202

See application file for complete search history.

(56) References Cited

U.S. PATENT DOCUMENTS 11,126,638 B1 * 9/2021 Fischer .................... G06F 16/26
2002/0042817 A1 * 4/2002 Lahr .................. H04N 21/2393 709/213
2012/0210356 A1 * 8/2012 Kiok .................. H04N 21/4316 725/39

(Continued)

OTHER PUBLICATIONS

Decision to grant a European patent pursuant to Article 97(1), Received for European Application No. 20816842.7, mailed on Oct. 4, 2024, 2 pages.

*Primary Examiner* — Nicholas R Taylor
*Assistant Examiner* — Tania M Pena-Santana
(74) *Attorney, Agent, or Firm* — Barta Jones, PLLC

(57) ABSTRACT

A stream tool is disclosed that allows a user to seamlessly connect with the different data streams, regardless of the streams' transmission platforms or communication protocols, in order to visually see a representation of the type of data that the data streams are transmitting. A user may specify a particular data stream and provide corresponding connection details. A collection of abstracted software functions enable interaction with the different stream platforms and protocols. Using these abstracted functions, a stream-processing service accesses a requested data stream and samples its data events for either sample timeframe or up to a threshold number of data events. The sampled data events are parsed and visually presented to the user in an easy-to-understand format. The user may then inspect the data stream's data for use in developing robust applications that may integrate and use such data.

20 Claims, 12 Drawing Sheets

(56) References Cited

U.S. PATENT DOCUMENTS

2012/0233640 A1* 9/2012 Odryna .............. H04N 21/4312
725/45
2013/0202025 A1* 8/2013 Baron .................... H04N 19/37
375/240.02
2014/0219637 A1* 8/2014 McIntosh ......... G11B 20/00007
386/282
2014/0241419 A1* 8/2014 Holmer ................ H04N 19/154
375/240.03
2016/0103911 A1* 4/2016 Logue ................. H04L 61/4541
707/695
2017/0285912 A1* 10/2017 Kaemmerer ........ G06F 3/04842
2019/0392257 A1* 12/2019 Foley ..................... G06N 5/022
2020/0044961 A1* 2/2020 Shomura ................. H04L 67/12
2020/0210430 A1* 7/2020 Shen ..................... G06F 16/221

* cited by examiner

FIG. 9

PLATFORM FOR MULTI-STREAM SAMPLING AND VISUALIZATION

CROSS-REFERENCE TO RELATED APPLICATION

This application is a continuation application of and claims priority to U.S. patent application Ser. No. 17/748,015, entitled "PLATFORM FOR MULTI-STREAM SAMPLING AND VISUALIZATION," filed on May 18, 2022, which is a continuation application of and claims priority to U.S. patent application Ser. No. 16/705,117, (Now U.S. Pat. No. 11,368,549) entitled "PLATFORM FOR MULTI-STREAM SAMPLING AND VISUALIZATION," filed on Dec. 5, 2019, the disclosures of which are incorporated herein by reference in their entireties.

BACKGROUND

With the proliferation of cloud computing, the execution risk within modern data architectures has shifted from "data at rest" to the "data in motion." Data storage is no longer the bottleneck it once was, and analytics have moved to specialized applications for online customer data, sensor readings for connected Internet of Things (IoT) devices, cybersecurity, blockchain, and the like. This has made stream processing a key concept in the field of "Big Data." Swaths of applications are being written today to process data in real-time instead of in logs or batched sets.

Today, streams of data (aptly called "data streams") supply cloud applications with a host of specialized data. Everything from social media posts, device telemetry data, web postings, IoT readings, and the like may be supplied to the cloud as a continuous data stream. Complicating things, however, is the fact that there are myriad different stream-processing software platforms and protocols for delivering data streams. There are currently a lot of different stream platforms and protocols, and each uses different software and data types to transmit data streams. For example, Apache Kafka, Azure® Event Hubs, MQ Telemetry Transport (MQTT), Advanced Message Queuing Protocol (AMQP), and the WebSocket protocol are just a few of the different platforms and protocols that may be used to transmit data streams over a network. And each uses its own unique software calls, e.g., Apache Kafka uses a different software development kit (SDK) than Azure® Event Hubs. A data engineer wanting to work with these different data streams must understand the different SDKs and associated data types of the platforms and protocols that deliver the streams. This complicates things when developing applications that consume real-time data, because few developers are acutely aware of the different stream platforms and protocols delivering desired data streams.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to various systems, methods, and computer-readable memory configured for sampling data streams requested by a user and visually presenting an indication of that data stream's data. Along these lines, a unified stream platform capable of interacting with different stream platforms using a common set of abstracted functions is provided as a backend to a stream tool that is presented to a user. A user may submit a request for a particular data stream to be analyzed. Upon receipt of the request, the data stream is accessed, and data events in that stream are sampled. Such sampling may occur for a set timeframe or up to a threshold count of sampled data events. The sampled subset of the data stream is parsed to identify the types of data and corresponding data values in the data events. These identified data types and values are used to generate a visual representation of the sampled subset of data events that may be presented to the user, visually indicating what data is being transmitted in the requested data stream. Such information is particularly useful to users developing applications for consuming data from the data streams. And the use of the unified stream platform allows the user to not have to be an expert in different stream platforms and protocols to view and understand the data being transmitted by disparate data streams.

BRIEF DESCRIPTION OF THE DRAWINGS

The disclosed examples are described in detail below with reference to the accompanying drawing figures listed below:

FIG. 9 is a block diagram of one example of a cloud-computing environment that may be used to host the disclosed stream-processing service, in accordance with some of the disclosed embodiments.

DETAILED DESCRIPTION

Figure 1:
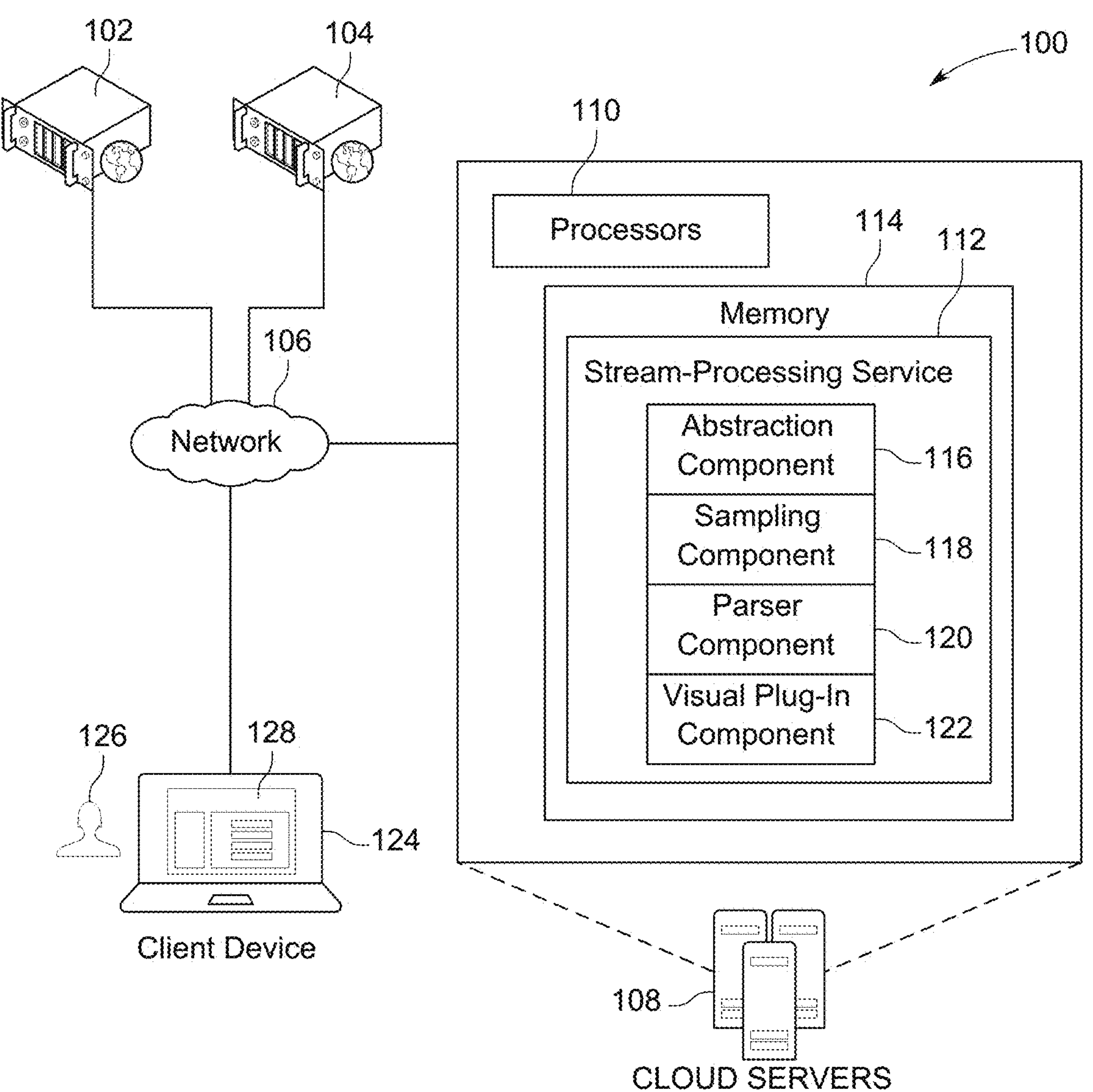
FIGS. 1-2 illustrate diagrams of a networked environment for implementing several of the embodiments discussed herein, in accordance with some of the disclosed embodiments.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Embodiments and examples disclosed herein are directed to a stream tool and a stream-processing service that enable a user to view samples of data from different stream producers that use different stream protocols. As previously discussed, there are many different stream protocols and platforms that may be used to transmit data streams. Instead of a user having to master these different stream protocols and platforms, the disclosed stream tool and stream-processing service operate between the data producer layer and the data manipulation layer to provide a user with a visual representation of the data being provided by disparate data streams that use different stream protocols. In some embodiments, the stream tool includes a client interface where a user, in some embodiments, is provided options for inputting connections details to different stream producers. The stream producers may provide data streams using different stream platforms and protocols, each of which has its own unique SDK or software functionality and specific routines for accessing data feeds.

To account for different stream providers and protocols that may be used, the stream tool operates with the (back-end) stream-processing service that has its own unified stream platform that is configured to operate with the various software functions of the different stream platforms and protocols. Put another way, the stream-processing service has its own unique SDK of software calls for operating with the SDKs of the various stream platforms and protocols. For example, open and close functions are implemented with the different software functions in Apache Kafka than in WebSocket. These different functions are mapped to common open and close functions of the unified stream platform to abstract the same functionality in different stream platforms and protocols to a single SDK of the unified stream platform. For example, a user may use the stream tool to view a representation of the data being sent from a first data stream that uses Apache Kafka and then switch to a visual representation of a second data stream that uses Azure® Event Hubs-all without the user having to know the underlying software calls, APIs, or transmission protocols being used by the different stream producers.

In some embodiments, data streams are only sampled for a certain amount of time (referred to herein as the "sample timeframe") or up to a sample threshold count of data events (referred to herein as the "sample count"). For example, the data events of a first stream may be sampled for only a 10 s stream timeframe or up for a sample count of 10 data events. In some embodiments, these sampled events are abstracted into the aforesaid abstract representations (using the unified stream protocol), parsed to identify their constituent data, and then presented to the user. In other words, some of the disclosed embodiments only sample a subset of a given data stream and visually represent data in that subset to the user. This allows the user to analyze what data is being captured in the data streams without having to understand the stream platform language and protocols used by the stream providers to transmit the data to the cloud.

In some embodiments, a client-side application of the stream tool allows the user to select different stream producers to analyze-regardless of underlying stream platform or protocol-through entering connection details (e.g., host and port information) in the stream tool. The requested stream provider is accessed using the contact information and a set of functions in the unified stream platform. Data from the accessed stream producer are sampled. This sampled data may then be parsed to identify specific data types and corresponding data values being transmitted in the data stream. For example, a data event may include telemetry data with a "location" data type and "Redmond, Washington" as the associated data value. These data type and associated data are parsed from the data event message and, in some embodiments, are visually displayed to a user as a representation of the data transmitted in the selected data stream.

Some of the embodiments disclosed herein provide an extendible stream sampling framework that is capable of capturing, parsing, and displaying data from different data streams that use disparate stream platforms and protocols. This allows a user to easily view data from different data streams without having to know a multiple SDKs for their stream platforms and protocols, saving developers considerable time and allowing them to build robust data-consumption applications for data streams that they previously could not access.

To aid the reader, some key definitions are provided below. A "stream producer" refers to an application that transmits a stream of data, such as, for example but without limitation, clickstreams; log data; telemetry data for devices; sensor data for devices; sensor data for devices; web data (e.g., interactions, search results, and the like); social-media data (e.g., postings, comments, interactions, etc.); gesture data; customer data; gaming data; video data; audio data; image data; blockchain data; financial transactions; traffic data; aerodynamic data; medical data; imaging data; authentication data; fluid data; or any other data that may be transmitted to a cloud-computing environment.

A "data event" refer to the single instances of data that are transmitted in the data streams. For example, one data event may be a posting on a social-media application that is transmitted upon being posted. A data stream is made up of a set of data events. Embodiments described herein frequently reference the sampling of a "subset" of data events in a data stream, meaning one or more of the data events in a data stream.

A "stream platform" refers to stream-processing software for transmitting real-time data feeds over a network. Examples of stream platforms include, without limitation, Apache Kafka, Apache Pulsar, Azure® Event Hubs, Rabbit MQ, RabbitMQ, Amazon® Kinesis, and the like. These different stream platforms have their own SDKs defining the various software calls, routines, and APIs for transmitting real-time data over a network. Even expert data engineers typically do not have commanding knowledge of the underlying SDKs for all of the different stream platforms, and having to get up to speed on each is impractical. Instead, the disclosed embodiments provide a stream tool that abstracts data transmitted by a scalable number of different stream platforms into a single unified stream platform, and then allows the abstracted data to be visually presented to a user for inspection. The disclosed embodiments and examples allow a developer to visually inspect the data of different data streams in order to create robust applications that use such data.

A "stream protocol" refers to the communications protocols used by the various stream platforms. Examples include of stream protocols include, without limitation, MQ Telemetry Transport (MQTT), Advanced Message Queuing Protocol (AMQP), WebSocket, and the like. These stream protocols typically have their own unique SDKs defining software for transmitting data events.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 illustrates a diagram of a networking environment 100 for use in processing data streams from different stream producers 102 and 104, in accordance with some of the disclosed embodiments. Stream producers 102 and 104 represent two separate stream producers that transmit different data streams over a network 106 to a cloud-computing environment. The cloud-computing environment is being operated by a collection of cloud servers 108, and may take the form of the example cloud-computing environment shown in FIG. 9. The data streams of stream producers 102 and 104 may include any number of data events (e.g., clickstream data, sensor data, telemetry data, etc.). While only two stream producers 102 and 104 are shown for the sake of clarity, any number of stream producers may be managed using the stream-processing techniques discussed herein. The networking environment 100 is merely one example of a suitable computing system environment and is not intended to suggest any limitation as to the scope of use or functionality of examples disclosed herein.

The cloud servers 108 represents a server or collection of servers of the cloud-computing environment. While the intricacies and hardware of cloud-computing need not be discussed herein, it should be mentioned that the cloud servers 108 include processors 110 programmed to execute a stream-processing service 112 that is stored in the memory 114. In some embodiments, the stream-processing service 112 includes at least the following processor-executable components for implementing the streaming tool disclose herein: an abstraction component 116, a sampling component 118, a parser component 120, and a visual plug-in component 122. These components 116-122 are stored in computer memory and executable by one or more processors 110 of the cloud servers. In operation, the components 116-122 allow the stream-processing service 112 to access the data streams the various stream producers 102/104, sample the data events in those streams, parse the sampled data events to identify the data types and data values therein, and generate a visual representation of the parsed data. Additional details about the operations of components 116-122 are discussed in more detail below in reference to FIG. 2.

A client computing device ("client device") 124 is also connected to the network 106. The client device 124 provides a user 126 with a stream tool 128 for requesting particular data streams for the stream-processing service 112 to analyze and for viewing the visual representations of the data in those data streams. In some embodiments, the stream tool 128 allows the user 126 to direct the stream-processing service 112 to analyze a data stream by entering the connection details for that data stream. The connection details may include a host identifier (e.g., uniform resource location (URL)), port identifier, or the like. The stream-processing service 112 may then connect to the requested stream producer using the provided connection details and begin to sample its data stream according to the sampling techniques discussed below (e.g., using a sample timeframe, sample count, or the like).

The network 106 may include any computer network, for example the Internet, a private network, cellular network, local area network (LAN), wide area network (WAN), or the like. The network 106 may include various network interfaces, adapters, modems, and other networking devices for communicatively connecting the disclosed devices. The network 106 may also include configurations for point-to-point connections. Computer networks are well known to one skilled in the art, and therefore do not need to be discussed at length herein.

Figure 2:
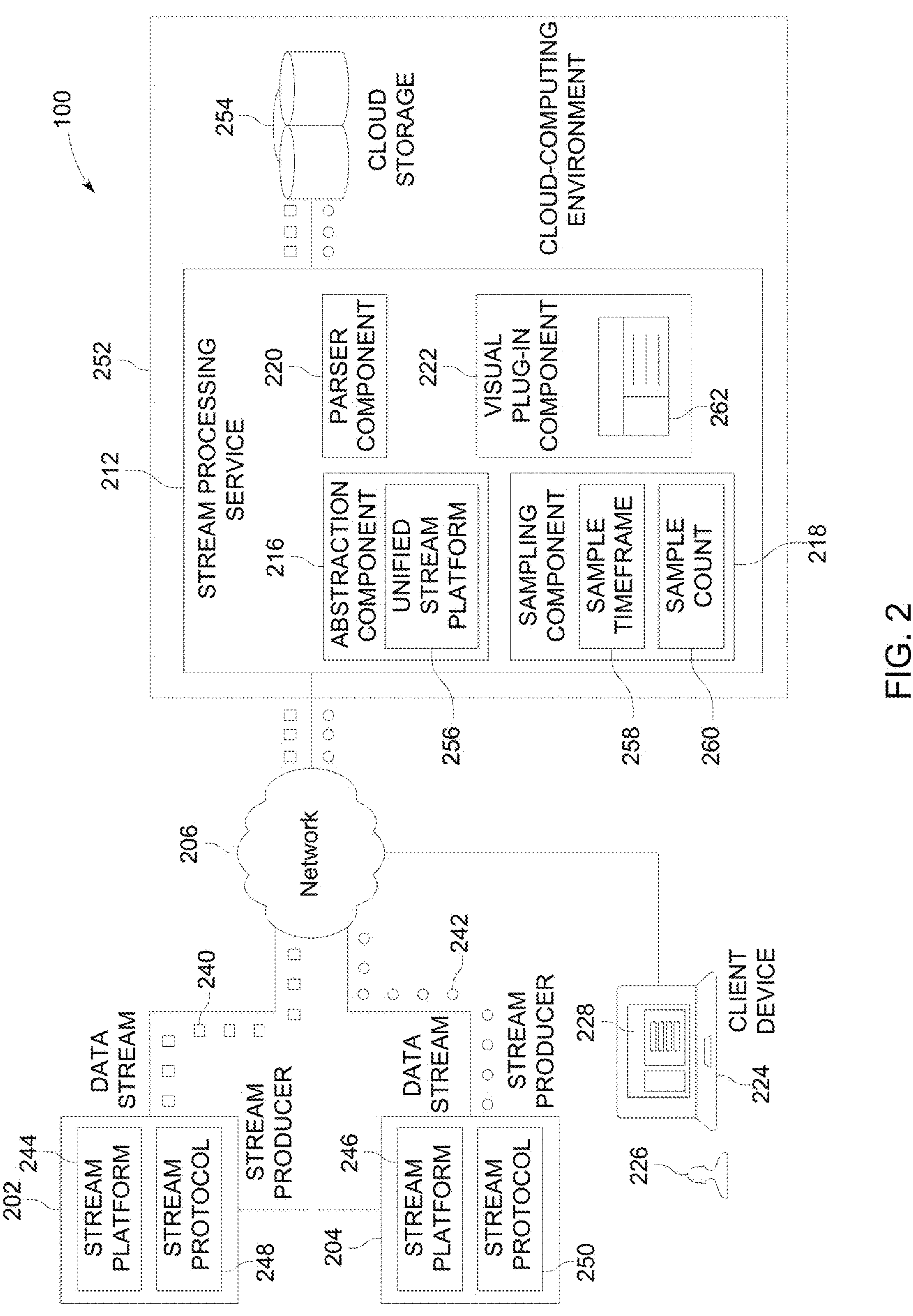

FIG. 2 illustrates a diagram of the networking environment 100 for use in processing data streams from different stream producers 202 and 204, in accordance with some of the disclosed embodiments. As shown, two different stream producers 202 and 204 are transmitting data streams 240 and 242, respectively, to a cloud-computing environment 252. The components, devices, and producers in FIG. 2 may operate in the same manner as the components, devices, and producers discussed in reference to FIG. 1

In some embodiments, the stream producers 202 and 204 use different stream platforms 244 and 246, respectively, to transmit their data streams 240 and 242. For example, stream producer 202 may use Apache Kafka as stream platform 244, and stream platform 246 may use Azure® Event Hubs stream platform 246.

Additionally or alternatively, the stream producers 202 and 204 use stream protocols 248 and 250, respectively, as their communications protocol to transmit the data streams 240 and 242. Like the stream platforms 244 and 246, these stream protocols 248 and 250 may also be different for the separate stream producers 202 and 204. For example, stream protocol 118 may be WebSocket, and stream protocol 120 may be MQTT. For the sake of clarity, only two stream producers 202 and 204 are shown, but any number of different stream producers, stream platforms, and/or stream protocols may be used.

Figure 9:
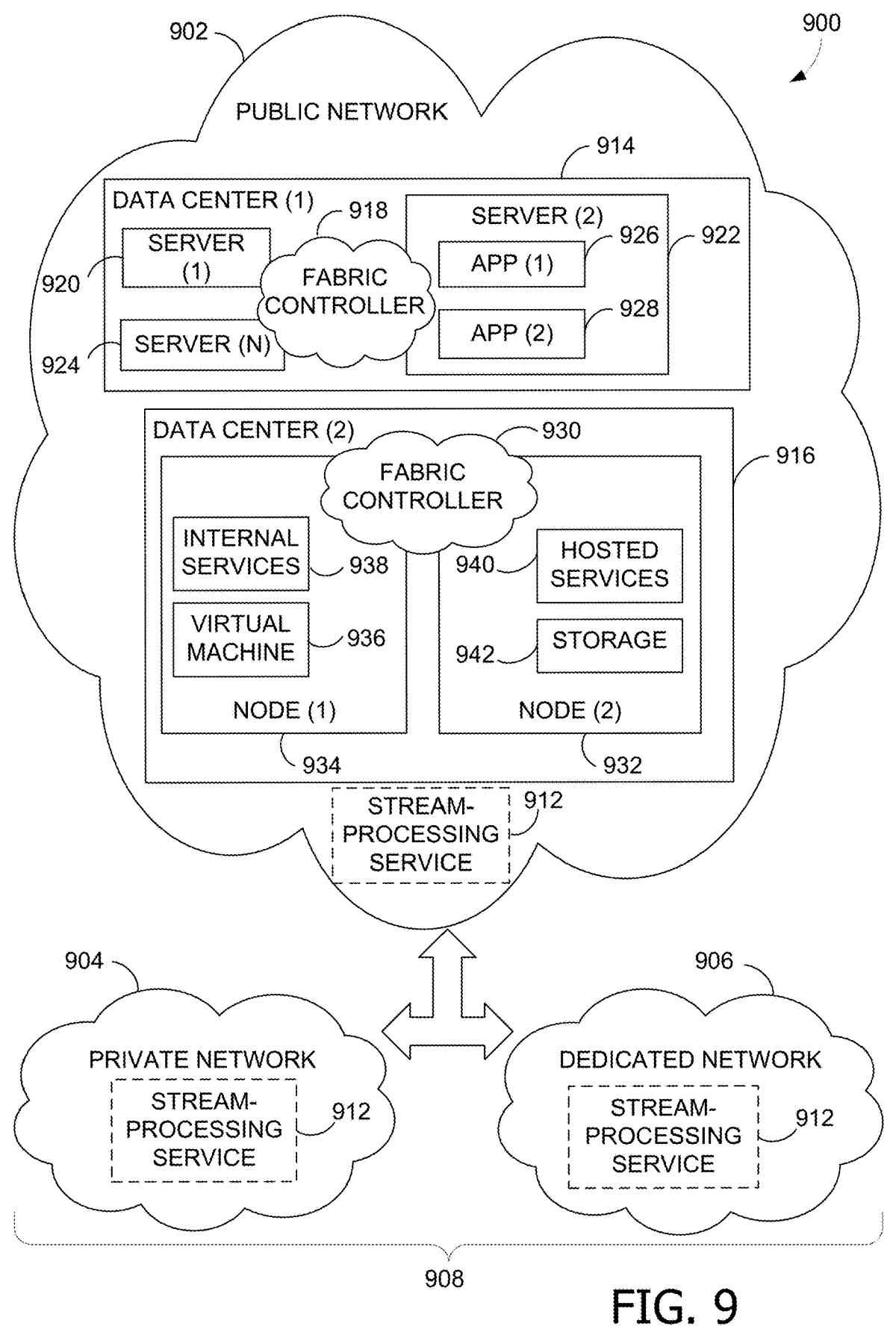

Cloud-computing environment 252 may be hosted across a network of servers, such as the cloud servers 108 referenced in FIG. 1. An example cloud-computing environment is shown in FIG. 9 and discussed in more detail below in reference thereto. A stream-processing service 212 is executed in the cloud-based environment 252 for sampling, analyzing, parsing, and presenting representations of the data streams 240 and 242 that are transmitted using the different stream platforms 244/246 and/or protocols 248/250. The cloud-computing environment 252 also includes or has access to a cloud storage repository 254 for cloud storage of the data streams 240/242 and any of the sampled, parsed, or presented portions thereof.

In some embodiments, the stream-processing service 212 includes at least the following processor-executable components: an abstraction component 216, a sampling component 218, a parser component 220, and a visual plug-in component 222. In some embodiments, these components 216-222 are stored in computer memory 114 and executable by processors 110 of the cloud servers 108 operating the cloud-computing environment 252.

The abstraction component 216 is executable by a processor to provide a unified stream platform 256 capable of interacting with the different stream platforms 244/246 and stream protocols 248/250 using a common set of abstracted functions. The unified stream platform 256 is a suite of abstracted functions for interacting with the different stream platforms 244/246 and stream protocols 248/250. Specifically, the unified stream platform 256 includes software routines, inputs, calls, APIs and the like that are mapped to corresponding software routines, inputs, calls, APIs and the like of the different stream platforms 244,246 and stream protocols 248,250. For example, the unified stream platform 256 may include an "open" function that is mapped to the equivalent "open" function in Apache Kafka using the calls specific to Apache Kafka, mapped to the equivalent "open" function in Azure® Event Hubs, and so on for the different stream platforms 244/246 and stream protocols 248/250. Kafka may use a different routine for "open" than Azure® Event Hubs. So the unified stream platform 256 may associate a Kafka-specific routine for the open call when interacting with Kafka and an Azure® Event Hubs-specific routine for the open call when interacting with Azure® Event Hubs.

Thus, the unified stream platform 256 is a common interface that maps the underlying software calls, routines, schema, data types, and/or APIs of a multitude of different stream platforms and protocols (e.g., stream platforms 244 and 246 and stream protocols 248 and 250) into a single platform and protocol. The unified stream platform 256 is scalable to accommodate any number of stream platforms and protocols—not just the two pairs of stream platforms 244 and 246 and stream protocols 248 and 250 that are illustrated. Virtually any stream platform and protocol may be added. The unified stream platform 256 abstracts the different software calls of multiple different stream platforms and protocols into a single SDK that is usable for interacting with a plurality of different stream platforms and stream protocols. This allows the stream-processing service 212 to interact with any data stream that a user requests, regardless of its stream platform or stream protocol.

The sampling component 218 samples portions of the data streams 240 and 242 requested by the user 226. To begin the process, some embodiments allow the user 226 to select or supply contact information for the stream producers 202 or 204 that the user 226 wishes to view. In some embodiments, the stream tool 228 provides a UI where the user 226 may submit the contact information for a given stream producer. The contact information may include a host identifier, uniform resource identifier (URI), port identifier, or other information for accessing data streams of a particular stream producer. In other embodiments, the user 226 may select a desired stream producer from a list of stream producers for which the stream-processing service 212 already has contact information.

Once the contact information of a desired stream producer is specified or obtained, in some embodiments, the sampling component 218 is configured to access the requested stream producer and sample data streams 240 or 242, either for a specific sample timeframe 258 or up to a threshold sample count 260 of data events. The sample timeframe 258 may be preset (e.g., 10 s), set within a range (e.g., 2-10 s), or dynamically adjusted based on the type of data in the sample stream. For example, streams of social-media posts may be sampled for longer than streams of clickstream data. Additionally, some embodiments will continue to sample for another instance of the sample timeframe 258 (e.g., for 10 more seconds) if no data events are received in a data stream during the initial sample timeframe 258. This process may be repeated until data events are captured or stopped after any of the sample timeframes, in different embodiments.

Additionally or alternatively, some embodiments sample data events only up to a threshold number of data events (e.g., 5, 10, 50, 100, etc.) and then stop. In this vein, the sampling component 128 uses the sample count 260 to count the number of data events received for a given data stream and stops sampling after a threshold number of data events have been captured. The threshold number of events may be a preset threshold number or may be dynamically set based on the type of data events being sampled. For example, fewer streams of web data may be sampled than streams of IoT sensor data.

In either case (sample timeframe or sample count), some of the embodiments sample only a subset of the data events in a data stream. Other embodiments may sample the entire data stream and continually parse and visually present the data therein. But for more purposes, only a subset of the data events are needed for a developer to understand the type of data being transmitted.

Sampling may be initiated once an initial data event for a data stream is received. In some examples, receipt of an initial data event triggers the sampling component 218 to begin capturing data events for the sample timeframe 260, or begin incrementing the sample count 260 and monitoring whether the threshold number of data events have been received. For example, the sampling component 218 may sample data stream 240 for 10 s upon receipt of its first data event, or may sample data stream 240 until 10 data events have been captured.

The parser component 220 analyzes sampled data events of a given data stream and identifies the different types of data and corresponding data values therein. In some embodiments, the parser component 220 initially identifies the type of message of a sampled data event to determine which schema or metadata to look for in understanding its constituent data types and corresponding data values. The data events may take the form of any number of messages types, such as, for example but without limitation, a JavaScript Object Notation (JSON), TXT, Apache AVRO (AVRO), protobuf, Apache Parquet (parquet), or other type of message. To detect the message type, some embodiments analyze the schema of a message, either as embedded in the message (e.g., JSON) or when a user has previously specified or provided the schema (e.g., protobuf). Once the type of message is identified, the parser component 220, in some embodiments, analyzes the data event and parses the data types and data values contained therein.

In some embodiments, the visual plug-in component 222 generates visual representations 262 of the sampled data events in a visual format that differs from the data events themselves. These visual representations 262 show the data types and corresponding data values parsed from the data events. The visual format of the visual representations 262 may be in easier-to-read format for the user 226 than the sampled data messages. Alternatively, the visual representations 262 may be assembled by the stream tool 228 on the client device 224, with the visual plug-in component 222 supplying the parsed data types and corresponding data values from the sampled data events. Regardless of where the visual representations 262 are created, they are eventually presented to the user 226 on the client device 224.

Thus, the stream-processing service 252 allows the user 226 to simply enter connection details for a particular data stream and receive back an informative visual display of the data being supplied by that data stream. The user does not need to know the underlying language or SDK of the stream platforms and protocols used by stream producers to transmit data streams. Instead, the stream-processing service 212 automatically handles all of the interactive functionality to integrate with a requested stream producer and sample a data stream long enough to identify the data being sent in that stream. The disclosed embodiments allow a user to quickly see the real-time data being delivered in any given data stream and provides useful visual representations of that data so that the user 226 may develop robust consumer applications that use various data streams. Also, the visual representations 262 allow the user 326 to view the data in a given data stream regardless of the stream platform or protocol (Azure® Event Hubs, Kafka, etc.) or message type (e.g., JSON, TXT, protobuf, parquet, etc.).

Also, moving the functionality for accessing, sampling, and parsing data streams to the cloud reduces the computational resources needed on the client device 224 to access such information. Traditionally, the user 226 would have to code the client device 224 to gain access and view a particular data stream. The cloud-computing environment 252 is far better suited to handle such processing, reducing the strain on the client device 224. The disclosed stream-processing service 212 allows the client device 224 to provide connection information and display the visual representations 262 of sampled data events.

Figure 3:
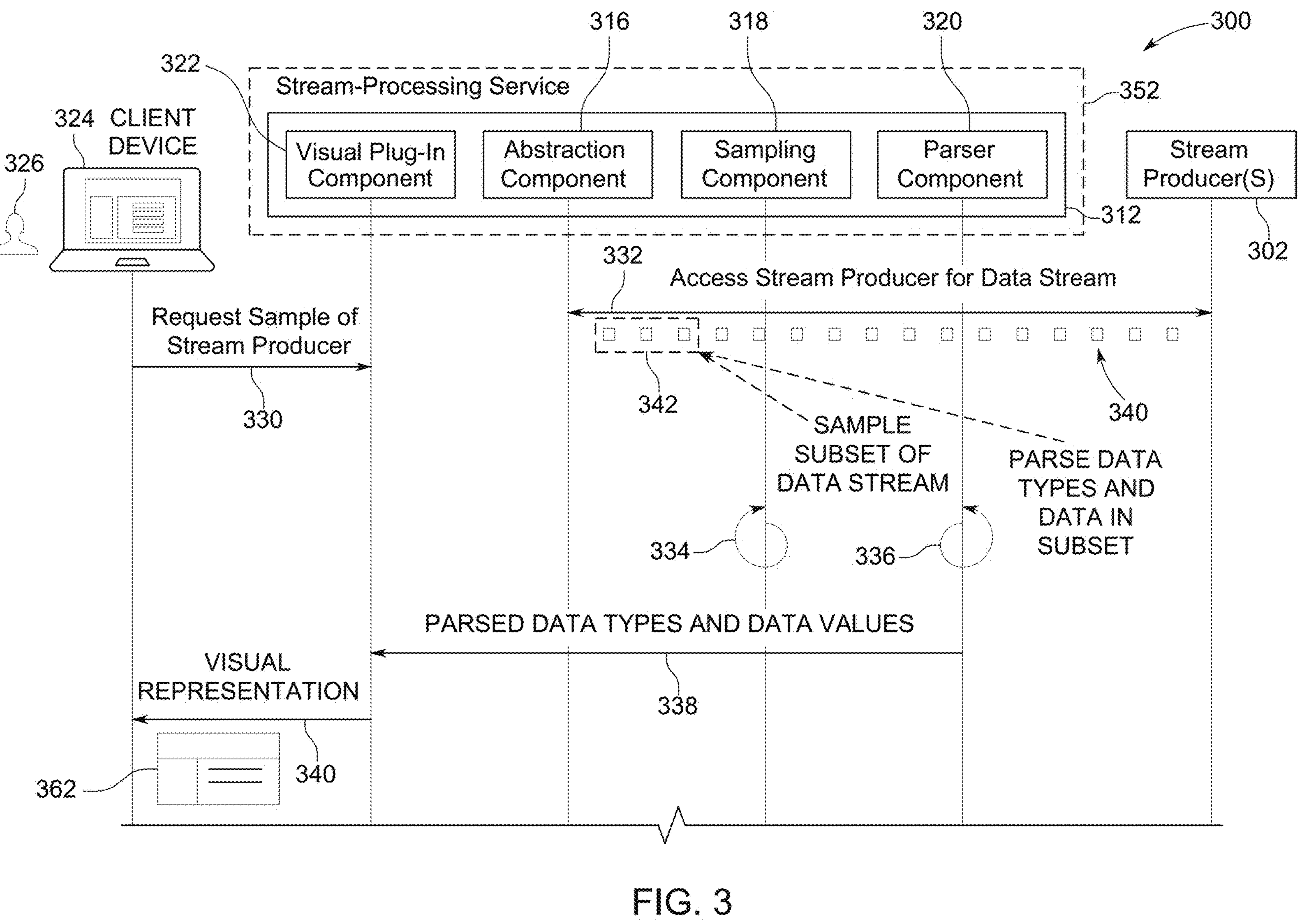
FIG. 3 illustrates a sequence diagram for operating a stream-processing service that analyzes and visually presents data of a requested data stream to a user, in accordance with some of the disclosed embodiments.

FIG. 3 illustrates a sequence diagram 300 for operating a stream-processing service 312 that analyzes and visually presents data of a requested data stream to a user 326. The sequence diagram 300 shows a stream-processing service 312 hosted in a cloud-computing environment 352 that may be accessed by the user 326 via a client device 324. In some embodiments, the stream-processing service 312 may access any of a host of stream producers 302 over a network (not shown for clarity). Also, the stream-processing service 312 includes an abstraction component 316, a sampling component 318, a parser component 320, and visual plug-in component 322, among other things. These components, devices, and producers may operate in the same manner as the components, devices, and producers discussed in reference to FIGS. 1 and 2.

In some embodiments, the user 326 may request that the stream-processing service 312 analyze a specific stream producer 302 by submitting a request to sample the stream producer 302, as shown at 330. This request may be received through the visual plug-in component 322, which visually interacts with the stream tool on the client device 324. In some embodiments, the request 330 includes connection information for the stream producer 302, such as, for example, port and host identifiers of the stream producer 302. Such connection information may be entered manually (e.g., host and port information) or discovered automatically based on service integration (e.g., connection information is detected in a cloud-computing environment when correct user permissions have previously been provided). In some embodiments, the abstraction component 316 locates the stream producer 302 using the connection information in the user 326's request and uses the unified stream platform to communicate with the stream producer 302 and access its data stream 340, as shown at 332.

The sampling component 318 samples a subset 342 of the data stream 340 for a sample timeframe or until a threshold number of data events are captured. This subset 342 of data events in the data stream are parsed by the parser component 312 to identify the data types and data values therein, as shown at 336. The parsed data types and data values are assembled into a visual representation 362 of the subset 342 of data events by the visual plug-in component 322. As shown at 340, the visual representation 362 may be sent to the client device 324 for presentation to the user 324. Alternatively, the parsed data types and data values may be directly sent to the client device 324, and an application on the client device 324 may generate the visual representation 362 of the subset 342 of data events.

In some embodiments, the user 326 only has to provide the connection information for the stream producer 302 of a data stream 340 he/she wishes to view, and the cloud-based stream-processing service 312 automatically retrieves, parses, and identifies the types and values of the data in the data stream 340. Thus, in such embodiments, the user 326 does not have to know the nuanced stream platform or protocol that is transmitting the data stream 340. Seeing the data types and data values of a sampling of the data stream 340 provides the user 326 with rich information for designing consumer applications for the data stream 340.

Additionally or alternatively, connection information may be entered automatically discovered based on service integration. For example, connection information for the data stream 340 may be detected in the cloud when correct user permissions have previously been provided. Thus, some embodiments may require a user to enter the contact information discussed herein; while other embodiments may automatically detect the contact information when a user has appropriate permissions for different data streams.

Figure 4:
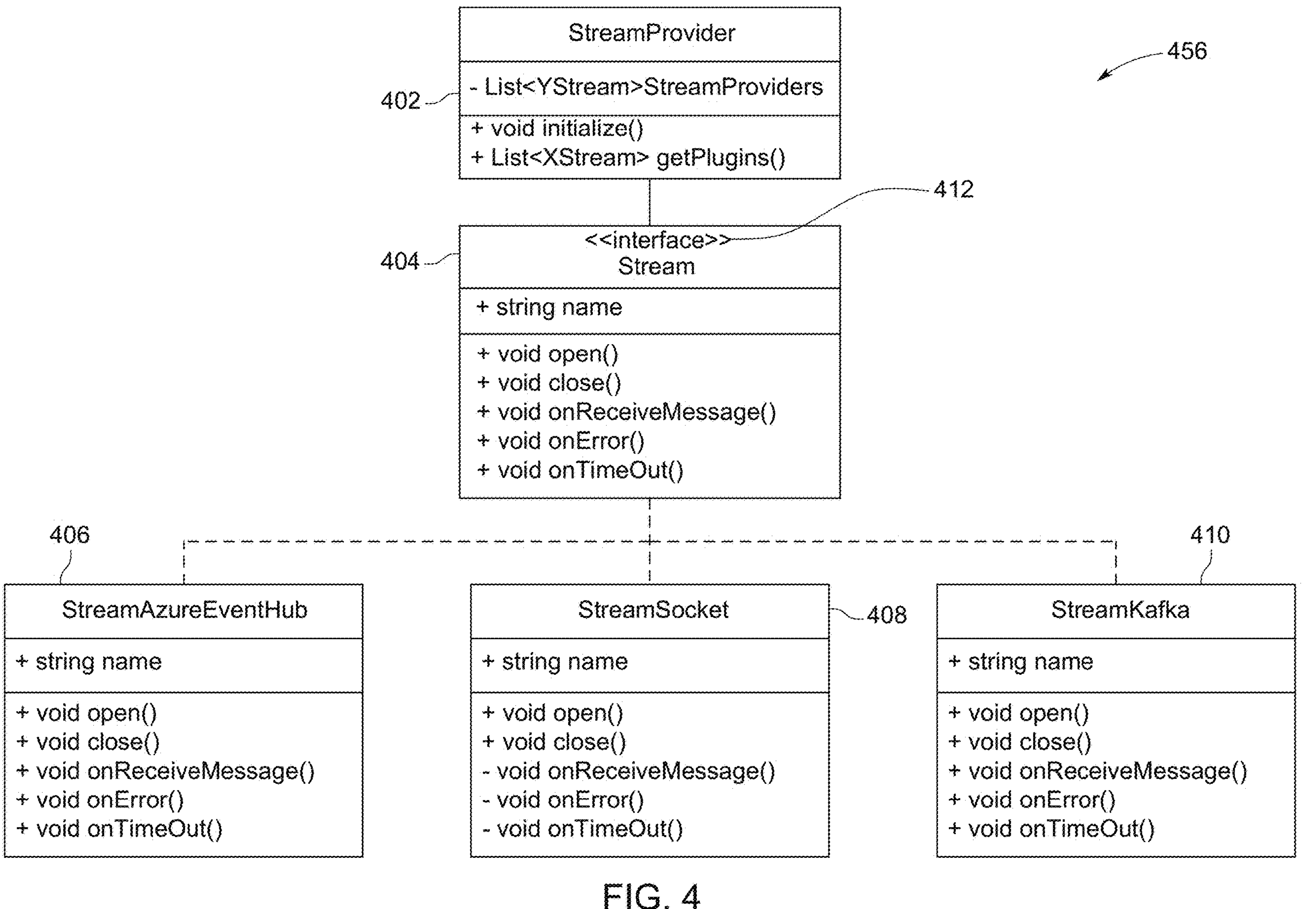
FIG. 4 illustrates a block diagram of a technology stack for a unified stream platform 456, in accordance with some of the disclosed embodiments.

FIG. 4 illustrates a block diagram of a technology stack for a unified stream platform 456, in accordance with some of the disclosed embodiments. In some embodiments, the unified stream platform 456 includes a list of different stream producers by stream platforms and protocols (referenced as StreamProvider 402) that are supported. For example, Apache Kafka, Azure® Event Hubs, and WebSocket. Additional stream platforms and protocols may alternatively or additionally be supported.

The unified stream platform 456 also includes abstracted functions 404 that are mapped to equivalent software calls, routines, inputs, and APIs of the supported stream platforms and protocols. For example, abstracted functions for opening and closing connections to a stream producer may be included. Also, specific to the disclosed embodiments, abstracted functions for sampling events may be specified as well. For example, "onReceiveMessage( )" may initiate sampling of a data stream upon receipt of a first data event, The routine "onError( )" may initiate sampling upon the occurrence of a system error (e.g., processing, timeouts, or other errors), and "onTimeOut( )" may begin or end sampling according to the sample timeframe.

In some embodiments, the abstracted functions 404 are mapped to their equivalent functions of the different stream platforms and protocols 406, 408, and 410 that are supported. For example, the "void open( )" abstracted function is mapped to the equivalent open functions in Azure® Event Hubs, WebSocket, and Apache Kafka. The open functions in these three stream platforms and protocols 406, 408, and 410 differ from each other, but each's open function is mapped to the open abstracted function 404. The other features of the different stream platforms and protocols 406, 408, and 410 are similarly mapped to the abstract functions 404. Such mapping allows the unified stream platform 456 to use the same abstracted functions to execute the corresponding software calls, routines, and functionality in the different stream platforms and protocols 406, 408, and 410.

Interface 412 allows different stream producers to be implemented in the unified stream platform 456. In some embodiments, the interface 412 allows for the list of stream platforms and protocols 406, 408, and 410 that are supported to be expanded.

Figure 5:
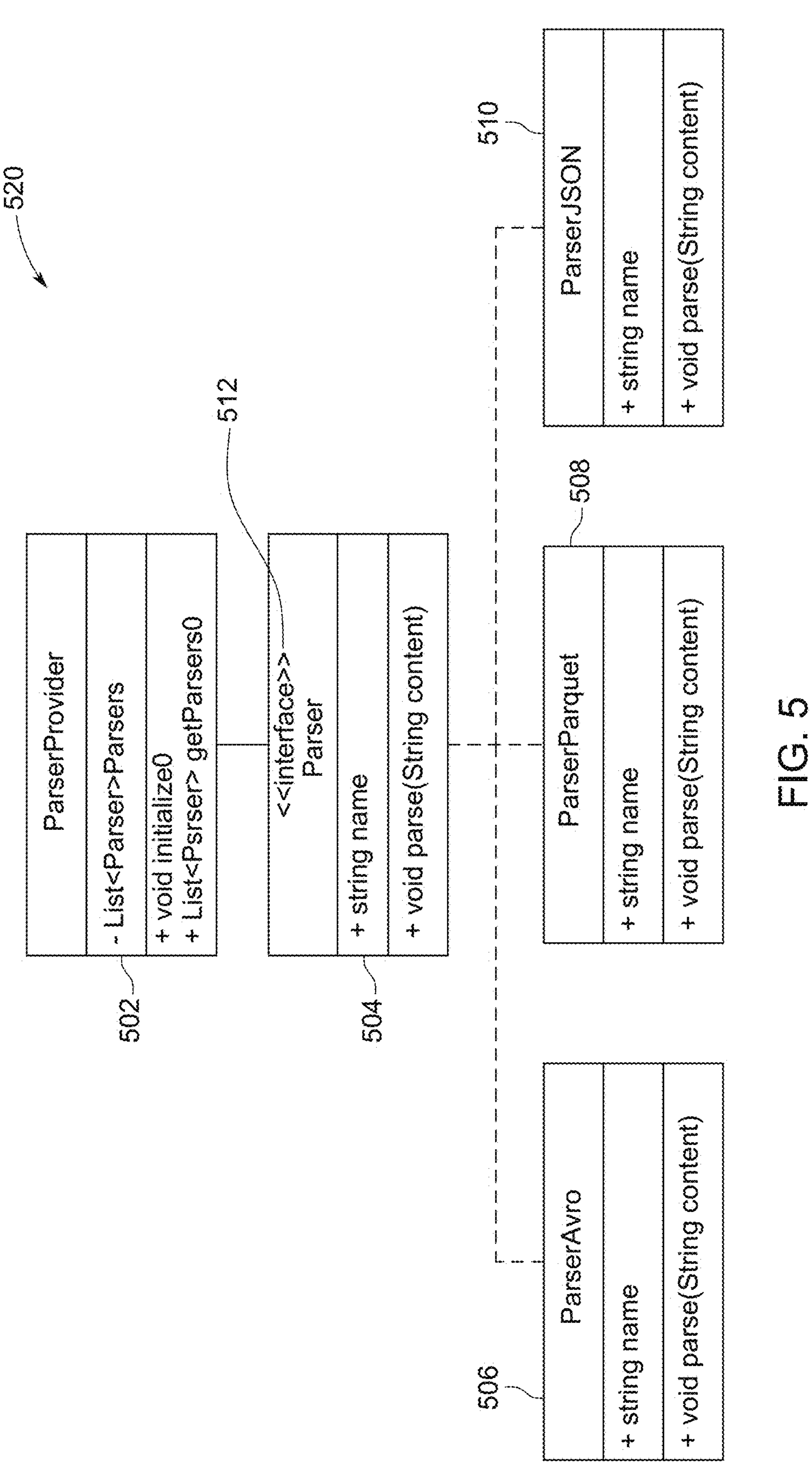
FIG. 5 illustrates a block diagram of a technology stack for a parser component, in accordance with some of the disclosed embodiments.

FIG. 5 illustrates a block diagram of a technology stack for a parser component 520 that performs the previously discussed features, in accordance with some of the disclosed embodiments. In some embodiments, the parser component 520 includes a list of different parser rules for different parsers types (listed in ParserProvider 502). For example, JSON, TXT, AVRO, protobuf, and parquet messages may all be supported, as shown at 506, 508, and 510. Additional message types may alternatively or additionally be supported.

The parser component 520 also includes parsing functions 504 that configured to search for different schema and data types in the supported message types. For example, the depicted parsing function 504 referenced as "parse (String content)" may be configured to execute different search functions for string names on AVRO messages that it does on parquet and JSON messages, due to the different schema and metadata provided for the different types of messages. In some embodiments, the specific schema, metadata, and search functions for each message type are specified for the different message types 506-510.

Interface 512 allows different message types to be added to the parsing component 520. Additionally or alternatively, the interface 512 may also be integrated with the visual plug-in components discussed herein, sending the parsed data types and corresponding data values thereto for generation of the visual representations of sampled data streams.

Figure 6A:
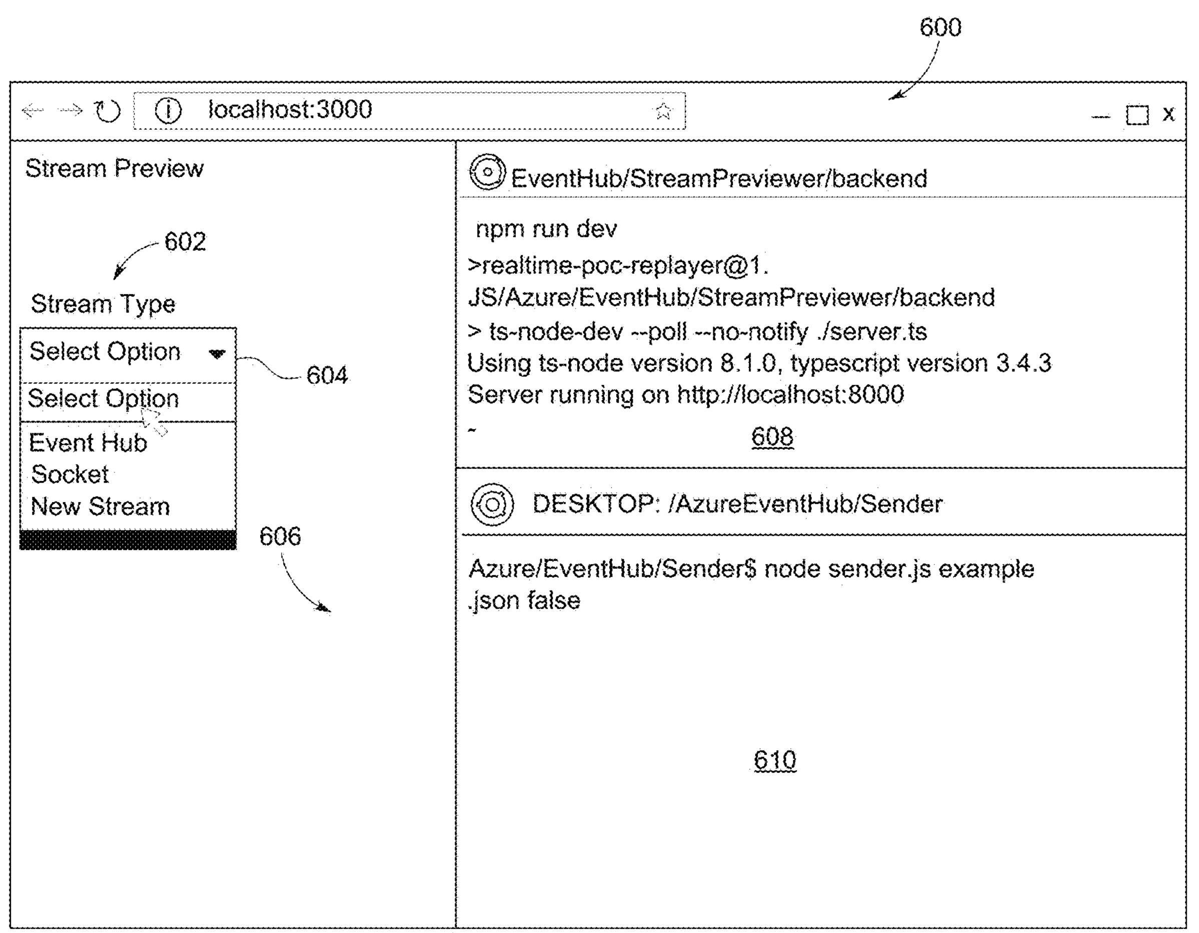
FIG. 6A is a UI diagram showing a UI of a stream tool showing a sampled data stream, in accordance with some of the disclosed embodiments.

FIG. 6A is a UI diagram showing a UI 600 of a stream tool, in accordance with some of the disclosed embodiments. In some embodiments, the search tool includes a platform/protocol UI option 602 where a user may select between different supported stream platforms and protocols that are available based on the user's permissions, or the user may elect to add a new data stream (e.g., by providing contact information thereto). The depicted example shows a situation where the user has adequate permissions to access two data streams ("Event Hub" and "WebSocket"). A stream preview UI portion provides UI showing a representation of the sampled data events. UI portion 608 illustrates the backend sampling of data that is received for a selected data stream, and UI portion 610 shows the emitted data of the data stream. UI portions 608 and 610 are typically not shown in stream tool, but are provided herein to further illustrate the disclosed embodiments.

Figure 6B:
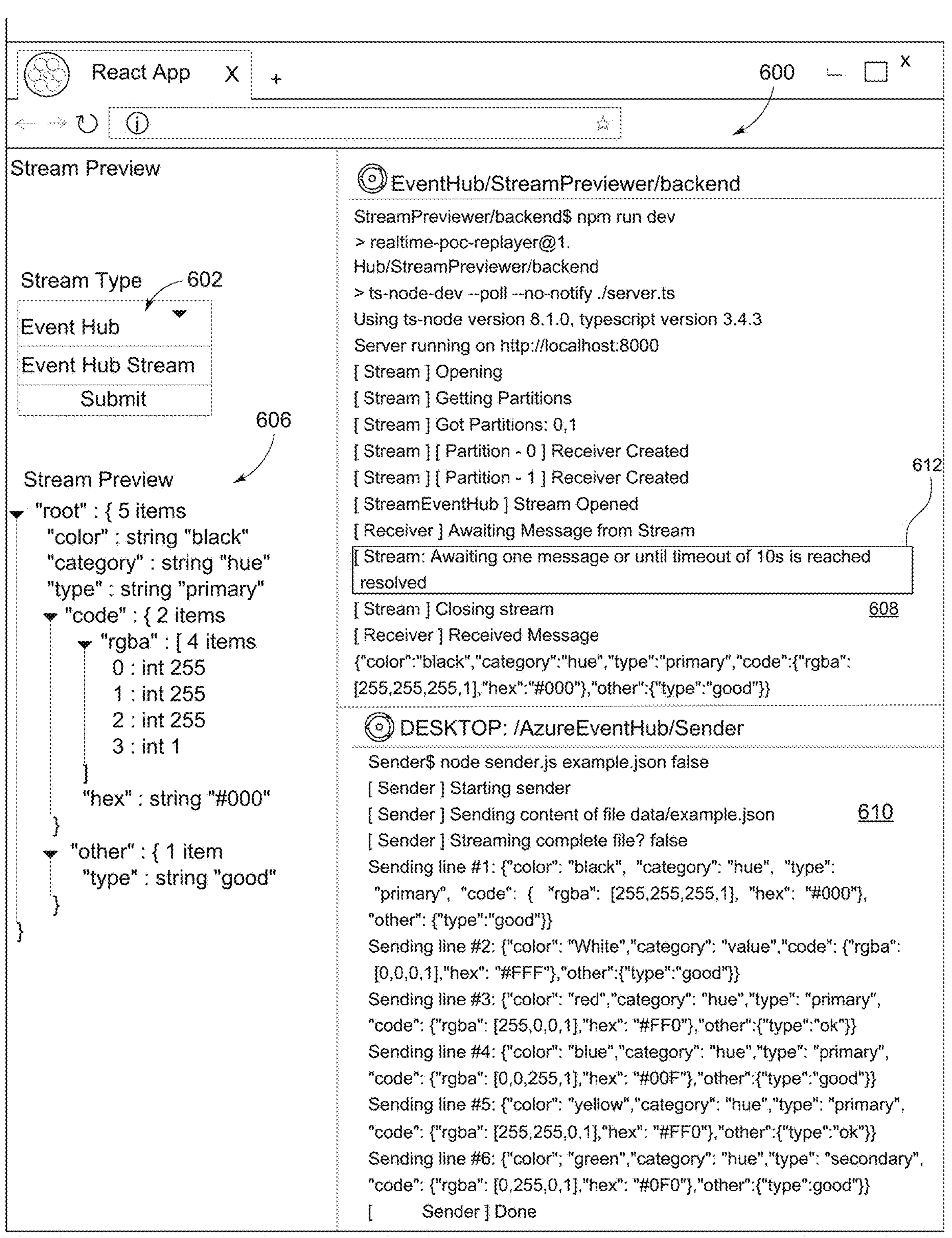
FIG. 6B is a UI diagram showing a UI of a stream tool showing a sampled data stream, in accordance with some of the disclosed embodiments.

FIG. 6B shows a scenario where the user has requested to view stream data that from an Azure® Event Hubs stream producer. In the stream preview UI portion 606 is a representation of the data received from the selected stream feed. The UI portion 608 showing the backend instructions shows that data was sampled until one data event was received or until 10000 ms passes. This combination of the initial data event and sample timeframe may be used to trigger data events, in some embodiments. Comparing the representation of data in the stream preview 606 with the raw data that was transmitted, as shown in UI portion 610, reveals that data and data types are parsed from the raw data and presented to the user in an easy-to-digest format.

Figure 6C:
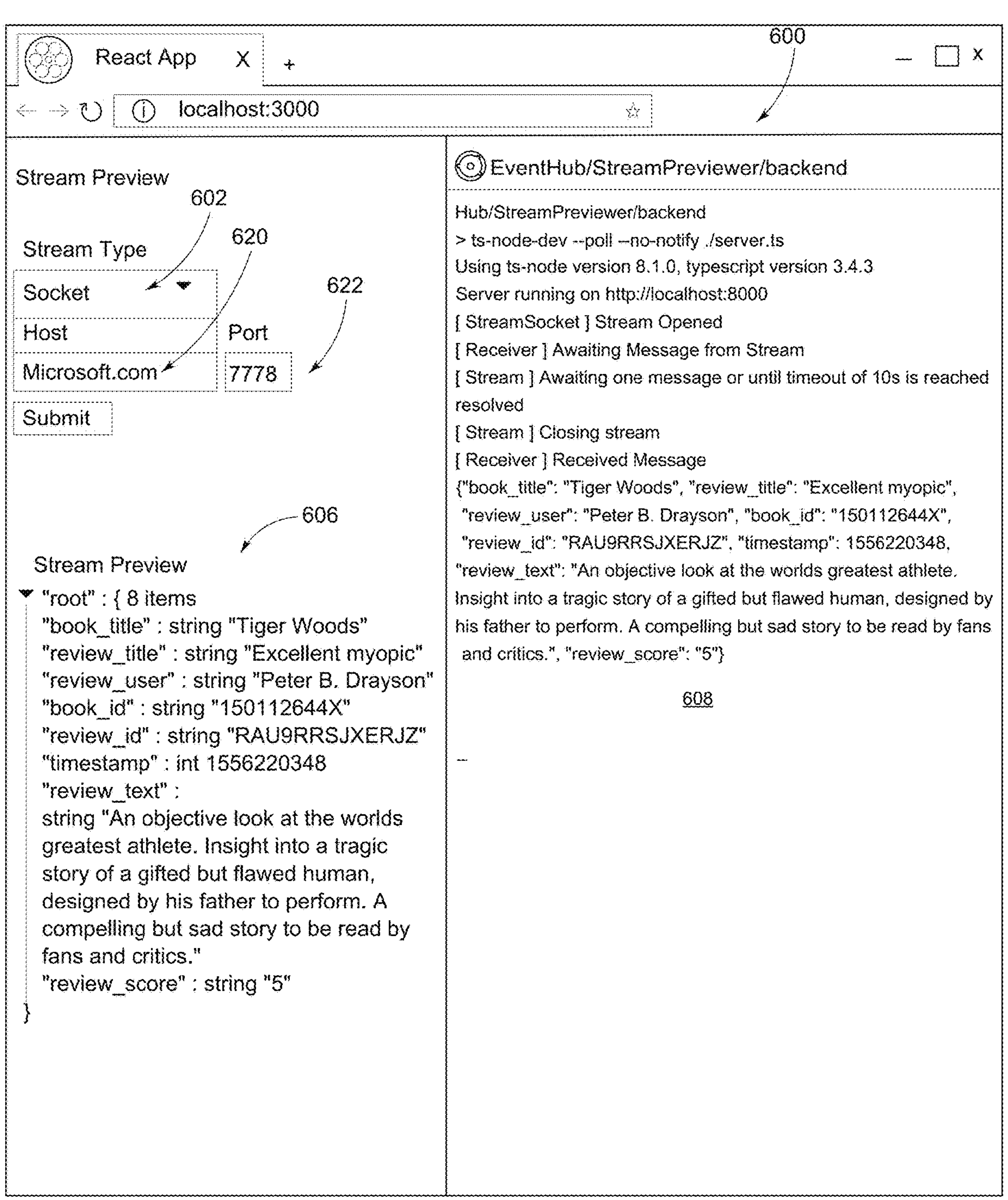
FIG. 6C is a UI diagram showing a UI of a stream tool showing a sampled data stream, in accordance with some of the disclosed embodiments.

FIG. 6C shows a scenario where the user has requested to view stream data that from a WebSocket stream producer. To do so, the user may enter a host identifier 620 and a port identifier 622 to connect the stream-processing service to the specific stream producer. In the stream preview UI portion 606 is a representation of the data received from the selected stream feed. As in the example of FIG. 6B, data was sampled until one data event was received or until 10000 ms passes.

Figure 7:
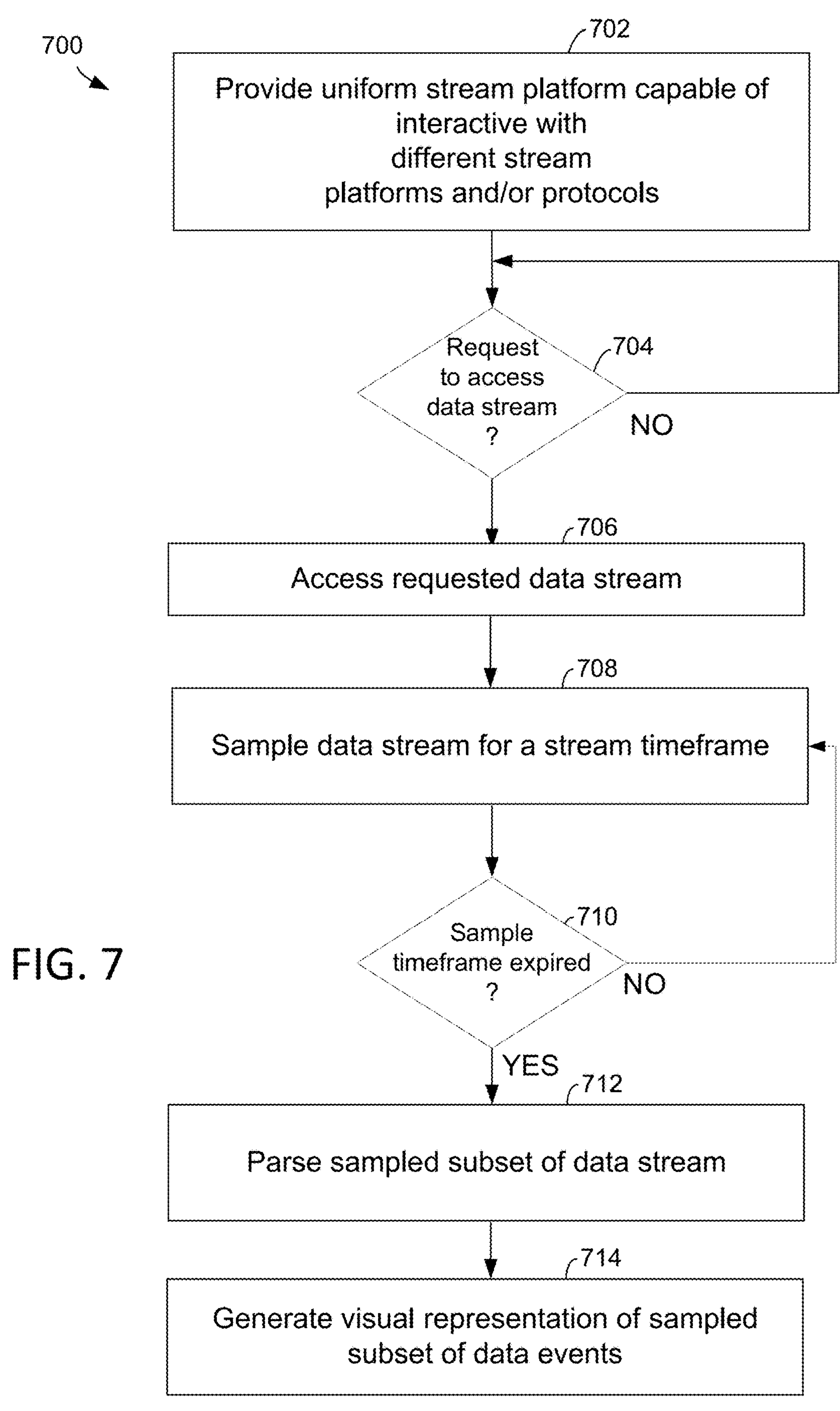
FIGS. 7-8 are flowchart diagrams illustrating various workflows for generating visual representations of data associated with a plurality of data streams that transmit data using different stream platforms, in accordance with some of the disclosed embodiments.

FIG. 7 is a flowchart diagram illustrating a workflow 700 for generating visual representations of data associated with a plurality of data streams that transmit data using different stream platforms, in accordance with some embodiments. As shown at 702, workflow 700 involves providing a unified stream platform that is capable of interacting with different stream platforms and/or protocols that have their own SDKs (e.g., MQTT, WebSocket, and AMQP). In some embodiments, the unified stream platform is provided as a cloud application that is available to users through the client-side stream tools discussed herein. With the unified stream platform abstracting various software functionality for different platforms and protocols, some embodiments wait for a user to request access to a particular data stream, as shown at decision box 704. For example, a user may navigate through the UIs shown in FIGS. 6A-6C to specify a data stream for sampling and also provide connection information thereto. When such a request is received, the requested data stream is accessed using the contact information, as shown at 706. Alternatively, connection information may be entered manually may be detected in the cloud when correct user permissions have previously been provided. The user may then selectively switch between already-accessible data streams using the UIs discussed herein.

The accessed data stream may then be sampled for a specific sample timeframe, as shown at 708. For example, sampling may occur for a preset or dynamically adjusted sample timeframe (e.g., 10 s). In such embodiments, sampling occurs until the sample timeframe expires, as shown by decision box 710. The sampled subset of the data stream is parsed to identify the data types and corresponding data values therein, as shown at 712. And one or more visual representations of the sampled subset of data events are generated for presentation to the user, as shown at 714. These visual representations may be generated in the cloud or on a user's client device using the identified data types and data values uncovered during the aforesaid parsing.

Figure 8:
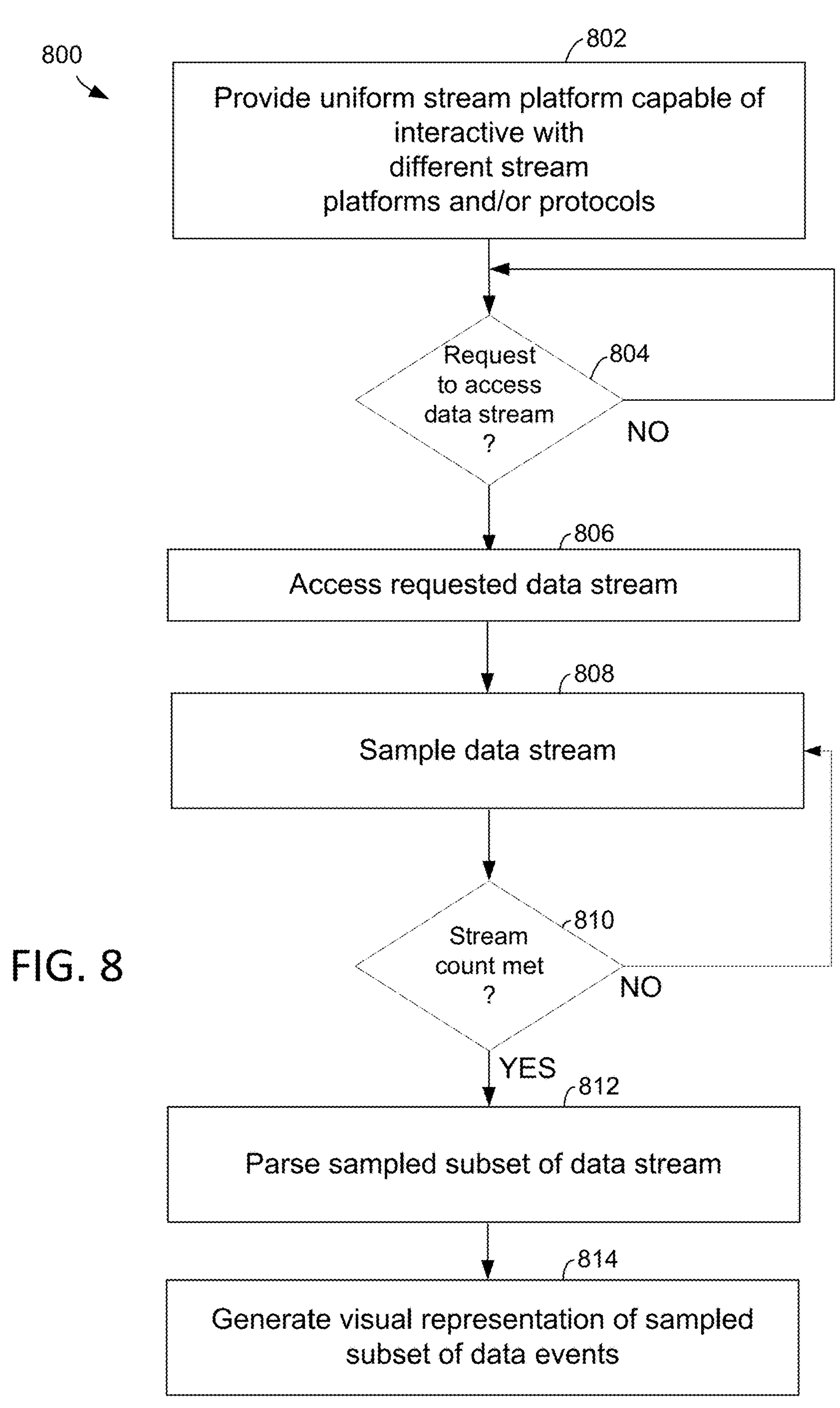

FIG. 8 is a flowchart diagram illustrating another workflow 800 for generating visual representations of data associated with a plurality of data streams that transmit data using different stream platforms, in accordance with some embodiments. As shown at 802, workflow 800 involves providing a unified stream platform that is capable of interacting with different stream platforms and/or protocols. With the unified stream platform abstracting various software functionality for different platforms and protocols, some embodiments wait for a user to request access to a particular data stream, as shown at decision box 804. For example, a user may navigate through the UIs shown in FIGS. 6A-6C to specify a data stream for sampling and also provide connection information thereto. When such a request is received, the requested data stream is accessed using the contact information, as shown at 806.

The accessed data stream may then be sampled up until a certain threshold stream count of data events are sampled, as shown at by decision box 706. For example, sampling may occur on the first received data event and up until 1, 5, 10, or another specific number of data events are received. The sampled subset of the data stream is parsed to identify the data types and corresponding data values therein, as shown at 812. And one or more visual representations of the sampled subset of data events are generated for presentation to the user, as shown at 814.

Example Cloud-Computing Environment

FIG. 9 illustrates a block diagram of one example of a cloud-computing environment 900, in accordance with some of the disclosed embodiments. Cloud-computing environment 900 includes a public network 902, a private network 904, and a dedicated network 906. Public network 902 may be a public cloud-based network of computing resources, for example. Private network 904 may be a private enterprise network or private cloud-based network of computing resources. And dedicated network 906 may be a third-party network or dedicated cloud-based network of computing resources. In some examples, the stream-processing services disclosed herein, and shown in FIGS. 1-5, may be hosted on either public network 902, private network 904, and/or dedicated network 906. To illustrate this point, a stream-processing service 912 is shown as being implementable in either the public network 902, private network 904, and/or dedicated network 906.

Hybrid cloud 808 may include any combination of public network 902, private network 904, and dedicated network 906. For example, dedicated network 906 may be optional, with hybrid cloud 908 comprised of public network 902 and private network 904. Along these lines, some cloud customers may opt to only host a portion of their customer data (not shown) in the public network 902 and/or dedicated network 906, retaining some of the customers' data or hosting of customer services in the private network 904. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 908 in which some data storage and processing is performed in the public network 902 while other data storage and processing is performed in the dedicated network 906.

Public network 902 may include data centers configured to host and support operations, including tasks of a distributed application, according to the fabric controller 918. It will be understood and appreciated that data center 914 and data center 916 shown in FIG. 9 are merely examples of suitable implementations for accommodating one or more distributed applications, and are not intended to suggest any limitation as to the scope of use or functionality of examples disclosed herein. Neither should data center 914 and data center 916 be interpreted as having any dependency or requirement related to any single resource, combination of resources, combination of servers (e.g., servers 920 and 924) combination of nodes (e.g., nodes 932 and 934), or a set of application programming interfaces (APIs) to access the resources, servers, and/or nodes.

Data center 914 illustrates a data center comprising a plurality of servers, such as servers 920 and 924. A fabric controller 918 is responsible for automatically managing the servers 920 and 924 and distributing tasks and other resources within the data center 914. By way of example, the fabric controller 918 may rely on a service model (e.g., designed by a customer that owns the distributed application) to provide guidance on how, where, and when to configure server 922 and how, where, and when to place application 926 and application 928 thereon. One or more role instances of a distributed application may be placed on one or more of the servers 920 and 924 of data center 914, where the one or more role instances may represent the portions of software, component programs, or instances of roles that participate in the distributed application. In other examples, one or more of the role instances may represent stored data that are accessible to the distributed application.

Data center 916 illustrates a data center comprising a plurality of nodes, such as node 932 and node 934. One or more virtual machines may run on nodes of data center 916, such as virtual machine 936 of node 934 for example. Although FIG. 9 depicts a single virtual node on a single node of data center 916, any number of virtual nodes may be implemented on any number of nodes of the data center in accordance with illustrative embodiments of the disclosure. Generally, virtual machine 936 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 936 may include processing capacity, storage locations, and other assets within the data center 916 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 930 is responsible for automatically managing the virtual machines running on the nodes of data center 916 and for placing the role instances and other resources (e.g., software components) within the data center 916. By way of example, the fabric controller 930 may rely on a service model (e.g., designed by a customer that owns the service application) to provide guidance on how, where, and when to configure the virtual machines, such as virtual machine 936, and how, where, and when to place the role instances thereon.

As described above, the virtual machines may be dynamically established and configured within one or more nodes of a data center. As illustrated herein, node 932 and node 934 may be any form of computing devices, such as, for example, a personal computer, a desktop computer, a laptop computer, a mobile device, a consumer electronic device, a server, and like. In one instance, the nodes 932 and 934 host and support the operations of the virtual machine(s) 936, while simultaneously hosting other virtual machines carved out for supporting other tenants of the data center 916, such as internal services 938, hosted services 940, and storage 942. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 902. The network cloud serves to interconnect resources, such as the role instances, which may be distributed across various physical hosts, such as nodes 932 and 934. In addition, the network cloud facilitates communication over channels connecting the role instances of the service applications running in the data center 916. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Example Operating Environment

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIGS. 1-5 and 9, where tasks are performed by remote-processing devices that are linked through a communications network.

Figure 10:
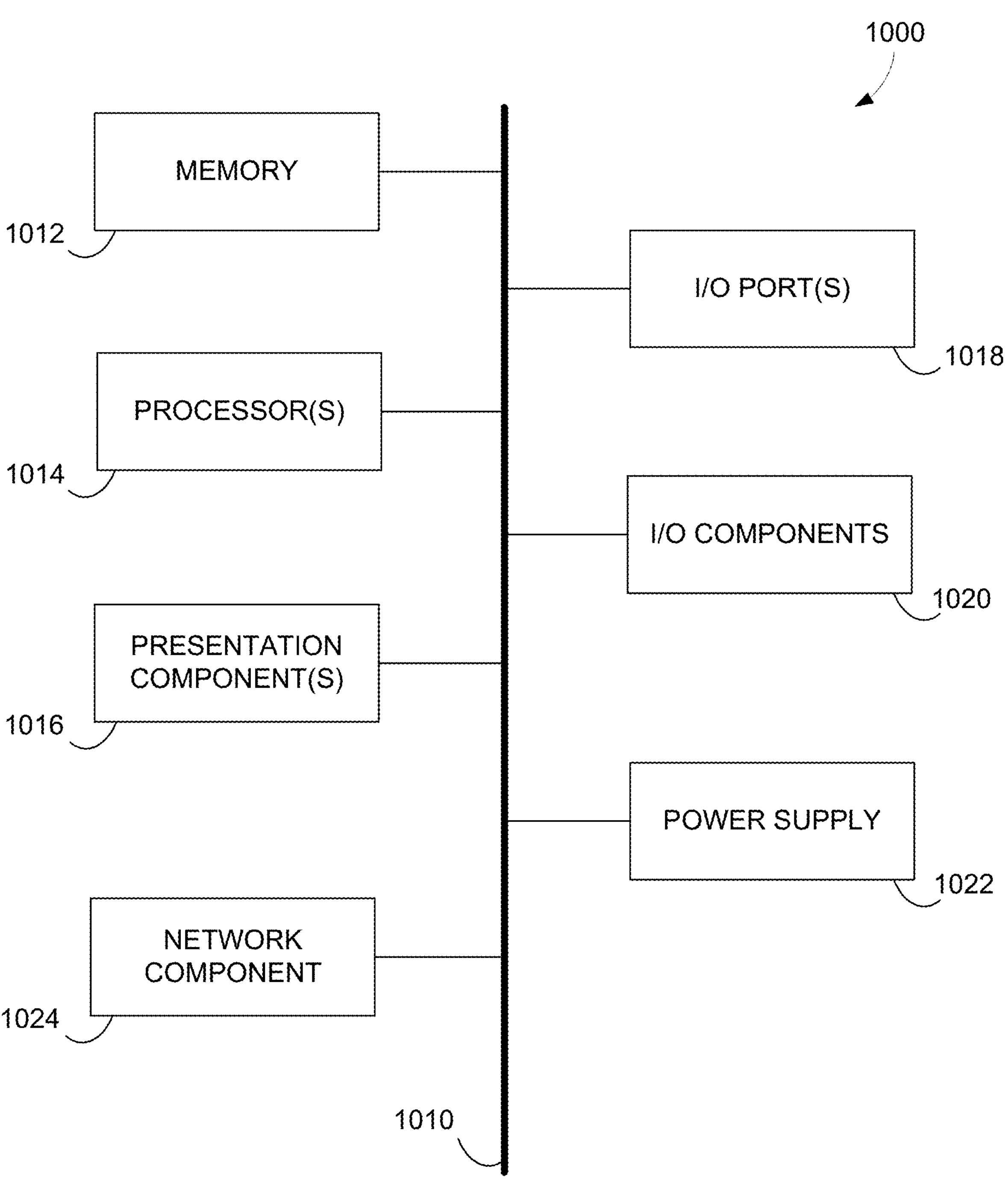
FIG. 10 is a block diagram of an example computing device, in accordance with some of the disclosed embodiments.

FIG. 10 is a block diagram of an example computing device 1000 for implementing aspects disclosed herein, and is designated generally as computing device 1000. Computing device 1000 is but one example of a suitable computing environment that may be used for the various client computing devices and servers discussed herein. Though, computing device 1000 is not intended to suggest any limitation as to the scope of use or functionality of the embodiments disclosed herein. Neither should the computing device 1000 be interpreted as having any dependency or requirement relating to any one or combination of components/modules illustrated.

Computing device 1000 includes a bus 1010 that directly or indirectly couples the following devices: computer-storage memory 1012, one or more processors 1014, one or more presentation components 1016, input/output (I/O) ports 1018, I/O components 1020, a power supply 1022, and a network component 1024. Computer device 1000 should not be interpreted as having any dependency or requirement related to any single component or combination of components illustrated therein. While computer device 1000 is depicted as a seemingly single device, multiple computing devices 1000 may work together and share the depicted device resources. For instance, computer-storage memory 1012 may be distributed across multiple devices, processor (s) 1014 may provide housed on different devices, and so on.

Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 10 is merely illustrative of an exemplary computing device that can be used in connection with one or more disclosed embodiments. Distinction is not made between such categories as "workstation," "server," "laptop," "hand-held device," etc., as all are contemplated within the scope of FIG. 10 and the references herein to a "computing device."

Computer-storage memory 1012 may take the form of the computer-storage media references below and operatively provide storage of computer-readable instructions, data structures, program modules and other data for the computing device 1000. For example, computer-storage memory 1012 may store an operating system, a universal application platform, or other program modules and program data. Computer-storage memory 1012 may be used to store and access instructions configured to carry out the various operations disclosed herein.

As mentioned below, computer-storage memory 1012 may include computer-storage media in the form of volatile and/or nonvolatile memory, removable or non-removable memory, data disks in virtual environments, or a combination thereof. And computer-storage memory 1012 may include any quantity of memory associated with or accessible by the display device 1000. The memory 1012 may be internal to the display device 1000 (as shown in FIG. 10), external to the display device 1000 (not shown), or both (not shown). Examples of memory 1012 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 1000. Additionally or alternatively, the computer-storage memory 1012 may be distributed across multiple display devices 1000, e.g., in a virtualized environment in which instruction processing is carried out on multiple devices 1000. For the purposes of this disclosure, "computer storage media," "computer-storage memory," "memory," and "memory devices" are synonymous terms for the computer-storage media 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 700, or by a processor external to the client computing device 1000. In some examples, the processor(s) 1014 are programmed to execute instructions such as those illustrated in the flowcharts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000.

Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways.

Ports 718 allow computing device 1000 to be logically coupled to other devices including I/O components 1020, some of which may be built in. Examples I/O components 1020 include, for example but without limitation, a microphone, joystick, game pad, satellite dish, scanner, printer, wireless device, etc.

The computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, the network component 1024 is operable to communicate data over public, private, or hybrid (public and private) using a transfer protocol, between devices wirelessly using short range communication technologies (e.g., near-field communication (NFC), Bluetooth™-branded communications, or the like), or a combination thereof.

Additional Examples

Some examples are directed to generating visual representations of data associated with a plurality of data streams that transmit data using different stream platforms. Such examples involve: providing a unified stream platform capable of interacting with different stream platforms using a common set of abstracted functions; receiving a request to access a first data stream, the request comprising connection information for a first stream producer supplying the first data stream using a first stream platform or protocol; accessing the first data stream from the first stream producer using the common set of abstracted functions; sampling a subset of data events of the accessed first data stream for a threshold sample timeframe or a threshold sample count; and generating a visual representation of the sampled subset of data events of the accessed first data stream for presentation to a user.

Some examples also involve identifying a message type associated with the subset of data events.

In some examples, the message type comprises at least one of a JSON, TXT, AVRO, protobuf, or parquet message.

Some examples also involve parsing the sampled subset of data events of the accessed first data stream to identify data and data types in at least one of the subset of data events; and presenting the data and the data types in the visual representation of the sampled subset of data events of the accessed first data stream.

Some examples also involve presenting, on a client device of the user, the visual representation of the one or more sampled data events.

In some examples, the sampling of the subset of data events of the accessed first data stream is triggered to occur upon receipt of a first data event of the first data stream.

In some examples, the common set of abstracted functions are mapped to the different stream providers through translating at least some of the common set of abstracted functions to a plurality of functions of the different stream providers.

In some examples, the sample timeframe is about ten seconds.

Some examples also involve determining the subset of data events were not received during the sample timeframe; and sampling for the subset of data events for a subsequent timeframe incident to the subset of data events not being received during the sample timeframe.

In some examples, the connection information comprises a host name and a port identifier associated with the first stream provider.

Some examples also involve accessing a second stream producer that uses a different stream platform than the first stream producer using the common set of abstracted functions of the unified stream platform; sampling a second set of data events of a second data stream from the second stream producer; and generating a second visual representation of the second sampled subset of data events of the sampled second set of data events of the second data stream for presentation to the user.

In some examples, the first stream comprises a stream of at least one of clickstreams, log data, telemetry data for devices, sensor data for devices, web data, social-media data, gesture data, customer data, gaming data, video data, audio data, image data, blockchain data, or financial transactions.

In some examples, the first stream platform comprises at least one of Apache Kafka, Apache Pulsar, Azure® Event Hubs, Rabbit MQ, RabbitMQ, or Amazon® Kinesis.

Other examples are directed to a system for generating visual representations of data associated with a plurality of data streams that transmit data using different stream platforms. The system includes: memory embodied with instructions for accessing a plurality of different stream providers using a unified stream platform capable of interacting with different stream platforms using a common set of abstracted functions; and one or more processors. The processor(s) are programmed to: access a first data stream from a first stream producer using the common set of abstracted functions; sample at least one data event of the accessed first data stream; parse the at least one data event to identify data types and corresponding data; and generate a visual representation of the at least one data event showing the data types and corresponding data identified through said parsing.

In some examples, the one or more processors are programmed to sample the at least one data event of the accessed first data stream for only a particular sample timeframe.

In some examples, the one or more processors are programmed to sample the at least one data event of the accessed first data stream until a preset sample count of data events has been received.

In some examples, the one or more processors are programmed to begin sampling the one or more data events upon receipt of an initial data event.

In some examples, said parsing comprises identifying a type of message of the sampled at least one data event.

Still other examples are directed to one or more computer storage memory embodied with computer-executable components configured for generating visual representations of data associated with a plurality of data streams that transmit data using different stream platforms. The components include: an abstraction component executable to provide a unified stream platform capable of interacting with the different stream platforms using a common set of abstracted functions; a sampling component to sample subsets of data events from the plurality of data streams that transmit data using different stream platforms, wherein the subsets of data events are only portions of data transmitted in the data streams; a parser component executable to identify different types of data in the subsets of data events; and a visual plug-in component executable to generate visual representations of the plurality of data streams of the sampled subsets of data events using the identified different types of data.

In some example, the sampling component is executable to only sample data for one or more sample timeframes or one or more sample counts.

While the aspects of the disclosure have been described in terms of various examples with their associated operations, a person skilled in the art would appreciate that a combination of operations from any number of different examples is also within scope of the aspects of the disclosure.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

receiving a request for access to a first data stream, the request comprising connection information for a first stream producer supplying the first data stream using a first stream platform;

receiving a sample of the first data stream;

parsing the sample of the first data stream to identify a data type and a corresponding data value in the sample, wherein parsing the sample of the first data stream comprises identifying a message type associated with the sample by analyzing a schema of a message of the sample; and displaying, on a user interface (UI), a stream preview UI portion showing visual representations of the identified data type and the corresponding data value in a visual format that differs from the sample of the first data stream.

2. The method of claim 1, wherein the connection information comprises at least one of a host name, a host identifier, a port identifier, or a uniform resource location (URL).

3. The method of claim 1, wherein the visual representations are generated by at least one of a cloud computing environment or a client device that includes the UI.

4. The method of claim 1, wherein parsing the sample of the first data stream comprises searching the message of the sample for at least one of the schema or a metadata.

5. The method of claim 1, wherein parsing the sample of the first data stream comprises selecting at least one of the schema, a metadata, or a search function based on the identified message type.

6. The method of claim 1, further comprising storing a list of different parser rules for different parser types.

7. The method of claim 1, wherein the message type comprises at least one of a JSON, TXT, A VRO, protobuf, or parquet message.

8. The method of claim 1, wherein the visual format of the visual representations displayed on the stream preview UI portion are in an easier-to-read format as compared to the sample of the first data stream.

9. The method of claim 1, wherein displaying the stream preview UI portion showing the visual representations of the identified data type and the corresponding data value comprises showing character strings representing the identified data type and the corresponding data value.

10. The method of claim 1, further comprising displaying, on the UI, a backend UI portion showing computer-executable code of backend instructions performed to sample the first data stream, wherein the computer-executable code of the backend instructions displays the at least one of a threshold sample timeframe or a threshold sample count of the sample.

11. The method of claim 1, wherein the identified data type comprises a location.

12. A system comprising:

memory embodied with instructions that cause a processor to:

receive a request for access to a first data stream, the request comprising connection information for a first stream producer supplying the first data stream using a first stream platform;

receive a sample of the first data stream;

parse the sample of the first data stream to identify a data type and a corresponding data value in the sample, wherein parsing the sample of the first data stream comprises identifying a message type associated with the sample by analyzing a schema of a message of the sample; and display, on a user interface (UI), a stream preview UI portion showing visual representations of the identified data type and the corresponding data value in a visual format that differs from the sample of the first data stream.

13. The system of claim 12, wherein parsing the sample of the first data stream comprises searching the message of the sample for at least one of the schema or a metadata.

14. The system of claim 12, wherein parsing the sample of the first data stream comprises selecting at least one of the schema, a metadata, or a search function based on the identified message type.

15. The system of claim 12, wherein the visual representations are generated by at least one of a cloud computing environment or a client device that includes the UI.

16. The system of claim 12, wherein the visual format of the visual representations displayed on the stream preview UI portion are in an easier-to-read format as compared to the sample of the first data stream.

17. A method comprising:

providing a unified stream platform capable of interacting with different stream platforms using common abstracted functions that sample data streams at least one of upon receipt of a first data event, upon occurrence of a system error, or according to a sample timeframe;

receiving a request for access to a first data stream, the request comprising connection information for a first stream producer;

accessing the first data stream from the first stream producer using the common abstracted functions;

parsing a sample of the first data stream to identify a data type and a corresponding data value in the sample, wherein parsing the sample of the first data stream comprises identifying a message type associated with the sample by analyzing a schema of a message of the sample; and displaying, on a user interface (UI), a stream preview UI portion showing visual representations of the identified data type and the corresponding data value in a visual format that differs from the sample of the first data stream.

18. The method of claim 1, wherein parsing the sample of the first data stream comprises selecting at least one of the schema or a metadata to search for, based on the identified message type.

19. The system of claim 12, wherein parsing the sample of the first data stream comprises selecting at least one of the schema or a metadata to search for based on the identified message type.

20. The method of claim 17, wherein parsing the sample of the first data stream comprises selecting at least one of the schema or a metadata to search for based on the identified message type.

* * * * *